July 16, 1957
G. I. KIRKLAND
2,799,834
SATURABLE REACTOR
Filed Dec. 31, 1952
FIG. 1.
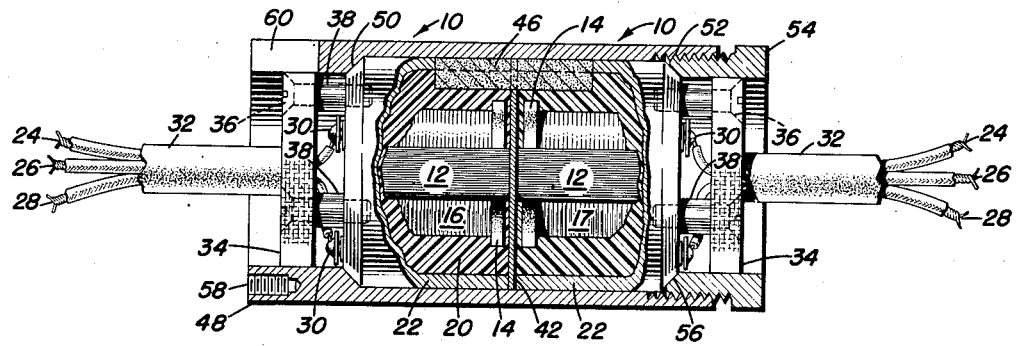
FIG. 2.
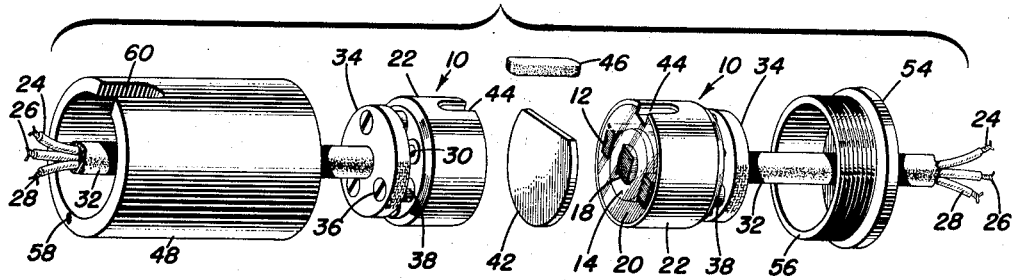
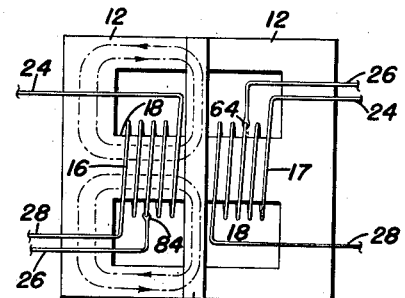
FIG. 3.
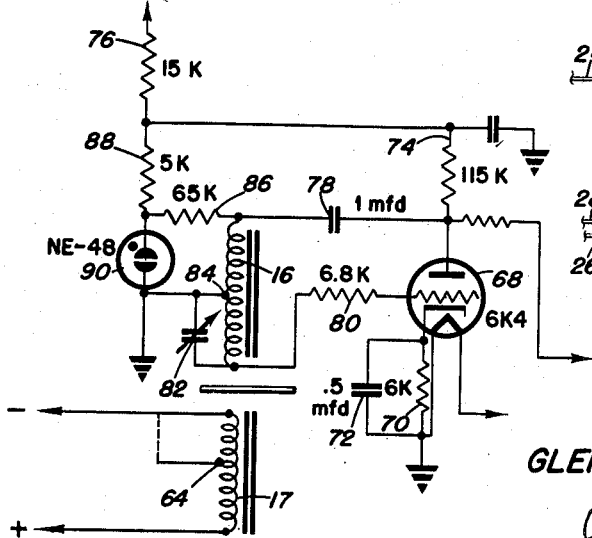
FIG. 4.
INVENTOR
GLENN I. KIRKLAND
BY *J. C. O'Brien*
*R. Baxter Warner*
ATTORNEYS United States Patent Office 2,799,834
Patented July 16, 1957

2,799,834

SATURABLE REACTOR

Glenn I. Kirkland, Silver Spring, Md., assignor to the United States of America as represented by the Secretary of the Navy Application December 31, 1952, Serial No. 329,055

1 Claim. (Cl. 336—90)

This invention relates to improvements in telemetering systems. In more detail the invention relates to a saturable reactor which can be combined with an oscillator circuit to provide an improved sensing and transmitting means for telemetering systems.

Basically, a saturable reactor of this type comprises cored coils arranged so that the variations in permeability of a core that are caused by a control current can be used to produce a desired effect in another circuit. Earlier devices of this type comprised a core of laminated material having a high permeability, a first coil wound on the core and connected to a source of alternating current, and a second or control coil wound on the core and arranged to be connected to a source of varying current. With this arrangement of core and coils a change in the current flowing in the control coil will produce an incremental change in the permeability of the magnetic core. This in turn changes the circuit constants of the coil connected to the source of alternating current. These changes in circuit constants can be utilized to produce a desired change in another circuit. A third coil to which a constant direct current is applied has been included in this arrangement to provide a bias so that the changes in permeability occur in the desired range.

It has been found that it is possible to utilize the changes in circuit constants to control the frequency of a vacuum tube oscillator so that the combination can be used in equipment for telemetering data in test flights of guided missiles. Thus, it is an object of this invention to provide an improved saturable reactor which can be combined with a vacuum tube oscillator.

It is a further object of the invention to provide a saturable reactor having a greater sensitivity to changes in the control current than previous reactors used for this purpose.

It is still a further object of the invention to provide a saturable reactor that is easy to manufacture reproducibly in large quantities so that the characteristics of the different reactors will be substantially alike.

Other objects and many of the attendant advantages of this invention will be readily appreciated as the same becomes better understood by reference to the following detailed description when considered in connection with the accompanying drawings wherein:

Fig. 1 is a side elevation of the saturable reactor with parts broken away and shown in section;

Fig. 2 is an exploded perspective view of the saturable reactor;

Fig. 3 is a diagrammatic illustration of the reactor; and

Fig. 4 is a schematic circuit diagram showing the combined saturable reactor and oscillator.

Briefly, the reactor provided by the invention comprises a pair of coil assemblies arranged so that the ends of the legs of the laminated cores of the assemblies are butted against the faces of a disc of highly permeable material. The disc is included in the magnetic circuit because of this arrangement. A control coil adapted to be connected to a source of varying direct current is wound on one core. The coil on the other core is connected in the plate-grid circuit of an oscillator so that changes in inductance of the coil will change the oscillator's frequency. This last coil is provided with a center tap connected to a direct current source to pre-bias the reactor.

Referring now to Figs. 1 and 2 of the drawing, it can be seen that the saturable reactor comprises a pair of substantially identical coil assemblies generally indicated by the reference numeral 10. Each coil assembly includes a core made from E-shaped laminations as indicated at 12, best seen in Fig. 3. A spool 14 having a center tapped coil 16 wound thereon is mounted on the center leg 18 of one core and a second spool 14 having a center tapped coil 17 wound thereon is mounted on the center leg of the other core. It is to be noted that, although different reference numerals are applied to the coils, in the embodiment illustrated these coils have the same number of turns of the same size wire and they differ in function only. In some applications it may be desirable to use coils having different numbers of turns and sizes of wire. The legs of the cores extend slightly beyond the spool, as shown in Fig. 1. The coils and the cores which carry them are potted in wax or some other suitable plastic 20 in over-sized cylindrical metal housings 22.

Connections are made to the coils in the housings by leads 24, 26 and 28 which enter the end walls of the housings through glass to metal seals indicated at 30. A protective sheath 32 is provided about the leads. A fibre disc 34 mounted in spaced relation to the end wall of each housing by screws 36 and spacers 38 is provided to protect the seals 30, and the leads passing through them. The sheathed leads are carried out through apertures provided in the discs.

The corresponding ends of the coil assemblies are machined flat and sanded smooth. These are then butted against the faces of a disc 42 of highly permeable material. Care is taken to insure a close fit between the ends of the laminations and the saturable disc 42. In order to retain the two assemblies in alignment a slot 44 is provided in the oversized housing and the potting compound of each assembly 10 to receive an aligning member 46 made of insulating material.

The two coil assemblies 10 are housed in a sleeve 48 of shielding material. A shoulder 50 is formed on the inside of the sleeve 48. Internal threads 52 are provided at one end of the sleeve to receive the threaded portion of an end cap 54. The inside dimension of the sleeve 48 and the end cap 54 are such that a second shoulder is formed by the rim 56 of the end cap. The aligned coil assemblies 10 and the permeable disc 42 are held tightly in place in the sleeve between the shoulders. The sleeve is provided at one end with a mounting hole 58, and a slot 60 by means of which the sheathed leads can be brought out through the sleeve.

Referring now to the diagrammatic showing of Fig. 3 and the circuit diagram of Fig. 4, the control coil is indicated at 17. For the purposes of telemetering systems used in missile tests this coil is connected to an end instrument such as a thermocouple, a strain gauge or some similar device (not shown) which produces a varying current as a measure of the particular physical quantity involved. This coil has a center tap connection 64 so that the sensitivity of the reactor can be lowered by reducing the number of active turns in the control coil 17, thereby reducing the effect of the current flowing in the coil on the permeability of the disc 42, if desired. The coil 16 of the other assembly 10 forms the inductance in the tank circuit of a Hartley type vacuum tube oscillator.

As can be seen in Fig. 4, the oscillator circuit includes triode vacuum tube 68. The cathode circuit includes cathode resistor 70, and by-pass condenser 72. The plate of the tube is connected to a source of D. C. supply through resistors 74 and 76. The plate is coupled to the grid through blocking capacitor 78, coil 16 and resistor 80 to provide the required feedback.

The coil 16 is provided with a center tap connection 84. The lower section of the coil 16 is tuned by variable capacitor 82 which is connected in parallel with said lower section. A fixed bias is applied to the upper section of the coil 16 by connecting it to the plate supply lead and feeding part of the current through the upper section of the coil 16. Dropping resistors 86 and 88 are inserted in the lead connecting the coil to the plate supply. A voltage regulator in the form of a neon bulb 90 is connected between the junction of resistors 86 and 88 and ground to neutralize the effect of changes in supply voltage on the sensitivity and base frequency of the device.

The operation of the device can be understood by first referring to Fig. 3. The path of the alternating magnetic flux due to the current flowing in the tank coil 16 is represented by the dotted lines. The flux path includes the permeable disc 42. A varying current flowing in the coil 17 connected to an end instrument will cause incremental changes in the permeability of the disc 42. Since the inductance of coil 16 is a function of the permeability of the flux path, the inductance will change correspondingly. As this inductance is an element of the frequency determining circuit of the oscillator, the frequency of the oscillator will change.

As was mentioned previously, the fixed bias applied to the coil 16 and the magnetic circuit associated therewith serves to locate the range of operation of the device with respect to the saturation curve of the reactor. A typical calibration curve indicating the relationship between oscillator frequency and control field current will show the effects of saturation and hysteresis of the reactor coil. The curve for one cycle (increasing the D. C. control field current from zero to a maximum and then reducing the current to zero) forms a loop due to hysteresis. The spread of the loop is least at certain points in the range so that the error due to hysteresis as the polarity of saturating current reverses is also least in this region. In addition, the slope of a typical curve decreases rapidly as the device approaches saturation. In the region of saturation, a larger change in control current is required to produce the desired shift in frequency. The fixed bias can thus be employed to shift the operating range to the desired point to provide greater sensitivity and a smaller error in the combined reactor and oscillator.

Obviously many other modifications and variations of the present invention are possible in the light of the above teachings. It is therefore to be understood that within the scope of the appended claim the invention may be practiced other than as specifically described.

What is claimed is:

A saturable reactor for use in telemetering systems comprising a first core of E-shaped laminations, a first winding on said core, a first sleeve partially enclosing said first core and said winding and having a keyway therein, said first core being fixed to said first sleeve, a second core of E-shaped laminations, a control winding on said second core, said control winding being electrically isolated from said first winding, a second sleeve partially enclosing said second core and said control winding and having a keyway therein, said second core being fixed to said second sleeve, a disk of ferromagnetic material separating said first core and said control winding, said disk and said cores being arranged so that the legs of said cores contact opposite faces of said disk with said legs in axial alignment and the keyways in said first and second sleeves in axial alignment, a key carried in said keyways and bridging said disk, and a housing securing said sleeves, cores, and said disk in aligned abutting relationship.

References Cited in the file of this patent

UNITED STATES PATENTS

| | | |
|---|---|---|
| 1,614,254 | Persons | Jan. 11, 1927 |
| 1,803,868 | Porter | May 5, 1931 |
| 1,838,315 | Lee | Dec. 29, 1931 |
| 2,026,758 | Turner | Jan. 7, 1936 |
| 2,137,433 | Wirz | Nov. 22, 1938 |
| 2,379,664 | Stanko | July 3, 1945 |
| 2,382,615 | Donley | Aug. 14, 1945 |
| 2,561,855 | Gould | July 24, 1951 |
| 2,623,205 | McCreary | Dec. 23, 1952 |